US011084007B2

(12) United States Patent
Adams

(10) Patent No.: US 11,084,007 B2
(45) Date of Patent: Aug. 10, 2021

(54) MIXING DEVICE WITH A STIRRING ELEMENT, A DRIVE DEVICE FOR DRIVING A STIRRING ELEMENT IN A MIXING DEVICE, A MIXING DEVICE SYSTEM AND A METHOD FOR DRIVING A STIRRING ELEMENT IN A MIXING DEVICE

(71) Applicant: Sartorius Stedim Biotech GmbH, Goettingen (DE)

(72) Inventor: Thorsten Adams, Goettingen (DE)

(73) Assignee: Sartorius Stedim Biotech GmbH

( * ) Notice: Subject to any disclaimer, the term of this patent is extended or adjusted under 35 U.S.C. 154(b) by 270 days.

(21) Appl. No.: 15/527,099

(22) PCT Filed: Oct. 9, 2015

(86) PCT No.: PCT/EP2015/001993
§ 371 (c)(1),
(2) Date: May 16, 2017

(87) PCT Pub. No.: WO2016/116117
PCT Pub. Date: Jul. 28, 2016

(65) Prior Publication Data
US 2017/0348655 A1     Dec. 7, 2017

(30) Foreign Application Priority Data

Jan. 20, 2015    (DE) ..................... 10 2015 000 704.1

(51) Int. Cl.
*B01F 13/08* (2006.01)
*H02K 5/128* (2006.01)
*H02K 7/14* (2006.01)
(52) U.S. Cl.
CPC ...... *B01F 13/0845* (2013.01); *B01F 13/0836* (2013.01); *B01F 13/0872* (2013.01);
(Continued)

(58) Field of Classification Search
CPC .. B01F 13/08; B01F 13/0827; B01F 13/0845; B01F 13/0836
(Continued)

(56) References Cited

U.S. PATENT DOCUMENTS 3,554,497 A    1/1971   Zipperer
4,199,265 A    4/1980   Sanderson et al.
(Continued)

FOREIGN PATENT DOCUMENTS

DE    44 38 132     5/1996
EP    0 612 135     8/1994
(Continued)

OTHER PUBLICATIONS

International Search Report dated Jun. 9, 2016.
European Examination Report dated May 31, 2019.

*Primary Examiner* — Elizabeth Insler
(74) *Attorney, Agent, or Firm* — Gerald E. Hespos; Michael J. Porco; Matthew T. Hespos

(57) ABSTRACT

A mixing device with a stirring element includes a container (3) for receiving fluids and/or solids, at least one rotatable stirring element (100) for mixing the fluids and/or solids, at least one bearing element for the support of the stirring element (100). The stirring element (100) has at least one non-permanently magnetized element (118) so that the stirring element (100) can be put in a rotational movement by externally induced reluctance forces. A drive device having at least two pair of coils (208) through which current flows also is provided. A mixing device system includes the mixing device and the drive device. A method also is provided for driving a stirring element in a mixing device.

11 Claims, 7 Drawing Sheets

(52) U.S. Cl.
CPC ........... *H02K 5/128* (2013.01); *H02K 5/1282* (2013.01); *H02K 7/14* (2013.01)

(58) Field of Classification Search
USPC ................................................ 366/273, 274
See application file for complete search history.

(56) References Cited

U.S. PATENT DOCUMENTS

| | | | |
|---|---|---|---|
| 6,306,658 | B1 | 10/2001 | Turner et al. |
| 6,517,231 | B1 * | 2/2003 | Biardeau ............. B01F 13/0818 366/273 |
| 7,357,567 | B2 | 4/2008 | Terentiev |
| 7,469,884 | B2 * | 12/2008 | Terentiev ............ B01F 3/04248 261/122.1 |
| 7,762,716 | B2 * | 7/2010 | Terentiev ................ B01F 7/162 366/273 |
| 8,708,319 | B2 | 4/2014 | Terentiev et al. |
| 2010/0008182 | A1 | 1/2010 | Krusche et al. |
| 2013/0042767 | A1 * | 2/2013 | Alet Vidal .......... B01F 13/0845 99/357 |
| 2015/0003189 | A1 | 1/2015 | Werth et al. |

FOREIGN PATENT DOCUMENTS

| | | |
|---|---|---|
| EP | 2 590 302 | 5/2013 |
| GB | 1 129 166 | 10/1968 |
| WO | 2005/068059 | 7/2005 |

* cited by examiner

MIXING DEVICE WITH A STIRRING ELEMENT, A DRIVE DEVICE FOR DRIVING A STIRRING ELEMENT IN A MIXING DEVICE, A MIXING DEVICE SYSTEM AND A METHOD FOR DRIVING A STIRRING ELEMENT IN A MIXING DEVICE

BACKGROUND

1. Field of the Invention

The present invention relates to a mixing device with a stirring element, to a drive device for driving a stirring element in a mixing device, to a mixing device system and to a method for driving a stirring element in a mixing device.

2. Description of the Related Art

Known from U.S. Pat. No. 7,357,567 B2 is a mixing device with a stirring element rotatably mounted in a container of the mixing device. The stirring element comprises a bearing rod, on which blade elements for mixing fluids are arranged. On a free end of the bearing rod, which is arranged adjacent to a container wall, a permanent magnet is located. Said permanent magnet is coupled magnetically to a driving magnet outside of the mixing device. If the driving magnet is set in rotation by means of an electric motor, the permanent magnet together with the bearing rod and the blade elements is subsequently set in rotation.

The mixing device used for this purpose is usually designed as a disposable mixing device, so that, after use of the mixing device, the mixing device together with the stirring element can be disposed of.

However, the production of permanent magnets, which are contained in the stirring element and disposed of with the stirring element and the mixing device, is cost intensive.

Therefore, it is the aim of the present invention to provide an alternative driving option for a stirring element in a mixing device, which is cost effective and which, in particular, does not negatively influence sterile conditions in a mixing device.

SUMMARY

According to an aspect, a mixing device with a stirring element is provided and comprises:
  a container for receiving fluids and/or solids;
  at least one rotatable stirring element for mixing the fluids and/or solids;
  at least one bearing element for mounting the stirring element;
  wherein the stirring element comprises at least one non-permanently magnetized element, so that it can be set in rotation by reluctance forces induced from outside.

The use of at least one non-permanently magnetized element in the stirring element enables the production of a stirring element with a simple structure. In particular, non-permanently magnetized elements require no special processing, so that the production or provision of a non-permanently magnetized element saves both time and costs. Moreover, by means of reluctance forces induced from outside, which set the stirring element in rotation, any driving elements that require the penetration of the container wall are dispensed with. In particular, sterile conditions possibly prevailing in the mixing device can be maintained reliably as a result. Furthermore, due to the reluctance drive, there is no need to provide, on the stirring element or within the mixing device, one or more permanent magnets or electrical windings for driving the stirring element, so that the mixing device can be provided reliably and cost effectively with a stirring functionality.

Elements that are particularly suitable as non-permanently magnetized element may be highly permeable materials (for example, with a permeability number $\mu_r>4$, preferably $\mu>100$, particularly preferably $\mu_r>300$) and/or soft magnetic materials, for example, iron cores and/or electrical steel plates or strips. Also suitable are iron, nickel, cobalt, alloys of the above-described materials which contain at least one of the above-described materials and at least one additional element, and ferrites.

The bearing element may be a bearing rod that protrudes into an inner space of the container and that can be inserted at least partially into the stirring element, in order to work as pivot bearing.

In one embodiment, the stirring element comprises a base body and plural blade elements arranged on the base body and configured to mix the fluids and/or solids in the container by rotation of the stirring element.

The base body may be substantially cylindrical and/or may comprise, on a lateral surface of the base body, at least one pair of pole protrusions that are arranged on opposite sides of the base body.

"Lateral surface" is here understood to mean the surface of the base body that extends around a stirring element rotation axis of the stirring element.

Each of the pole protrusions may have one of the non-permanently magnetized elements arranged therein.

In other words, the non-permanently magnetized elements in a pair of pole protrusions form magnetic poles on which the reluctance forces induced from outside act in order to set the stirring element in rotation.

The container may have at least one cylindrical wall recess, in which the base body of the stirring element is inserted at least partially. As a result, a reliable mounting of the stirring element can be ensured. Moreover, the elements generating the reluctance forces may be arranged around the base body.

At least one wall surface area of the container, in which the wall recess is arranged, may be rigid. Disposable mixing devices usually are designed to be flexible. Thus, a reliable mounting of the stirring element can be ensured by means of a rigid area.

According to another aspect, the underlying aim is attained by a drive device for driving a stirring element in a mixing device. An embodiment of the drive device may comprise:
  a stator housing on which the mixing device with fluids and/or solids to be mixed can be attached;
  at least two pairs of coils through which current can flow and that are arranged in pairs on opposite sides with respect to a stator housing rotation axis; and
  a control device that is designed so that current flows successively through the pairs of coils, so that the stirring element of the mixing device can be driven by reluctance forces induced in the stirring element.

In other words, the drive device comprises at least two pairs of coils. The coils of a pair are arranged on opposite sides from one another with respect to a stator housing rotation axis. The coils of the drive device may be arranged in a circle. By means of a control device, current can be controlled in such a manner that current flows successively through the pairs of coils. Current may flow successively through the pairs in the clockwise or counterclockwise direction. The pair of coils through which current flows at a given time generates a magnetic field that can exert an influence on a stirring element in the mixing device once this stirring element is in the magnetic field that is generated. By means of the reluctance forces induced by the magnetic field, the stirring element can be set in rotation. In other words, a stirring element in a mixing device can only be set in rotation by forces acting from outside on the stirring element. Any components that penetrate the container wall can be dispensed with in the drive device, so that sterile conditions in a mixing device are not influenced negatively. Moreover, the drive device comprises no rotating element, so that the risk of particle formation, which is particularly problematic when the drive device is used in a clean room, can be avoided. The arrangement of the drive device in a dust-proof housing can thus be avoided.

The rotation axes of the coils intersect the stator housing rotation axis substantially perpendicularly. By means of such an arrangement of the coils, the magnetic fields generated by the pairs of coils and the reluctance forces generated thereby can act in a particularly advantageous manner on a stirring element in a mixing device. As a result, a rotation of the stirring element for mixing the fluids and/or solids in the mixing device can be induced very reliably.

The stator housing may have a stator recess, into which the stirring element of the mixing device can be inserted The coils are arranged at least partially in a recess wall that limits the stator recess in lateral direction along the stator housing rotation axis.

The stator recess is designed here in such a manner that an area of the mixing device, together with at least a portion of the stirring element, can be inserted into the stator recess. The coils of the drive device as a result surround the stirring element at least partially, so that the induced reluctance forces of the coils can act advantageously on the stirring element.

In another aspect, the underlying aim is attained by a mixing device system, that may comprise:
  a mixing device according to one of the embodiments of the aspect explained above; and
  a drive device according to one of the embodiments of the aspect explained above;
  wherein a stirring element rotation axis and the stator housing rotation axis are identical.

The number of pairs of coils in the drive device may be greater than the number of pairs of pole protrusions. As a result, it is possible to ensure that the stirring element can at no time be in a state or in a position in which the stirring element no longer is exposed to any impetus to rotate because it already has reached the state in which the magnetic field is greatest or the reluctance is smallest.

Furthermore, the underlying aim may be attained by a method for driving a stirring element in a mixing device, that may comprise:
  providing a mixing device with a stirring element that is rotatably mounted in the mixing device and comprises at least one non-permanently magnetized element;
  providing a drive device, for driving the stirring element, with pairs of coils which are arranged on opposite sides with respect to a drive device rotation axis; and
  attaching the mixing device onto the drive device, so that, when current flows sequentially through the pairs of coils, reluctance forces act on the stirring element and set it in rotation.

These and other aims, features and advantages of the present invention become clearer upon studying the following detailed description of preferred embodiments and the appended drawings. It is apparent that, although embodiments are described separately, individual features thereof can be combined to form additional embodiments.

DETAILED DESCRIPTION

Figure 1:
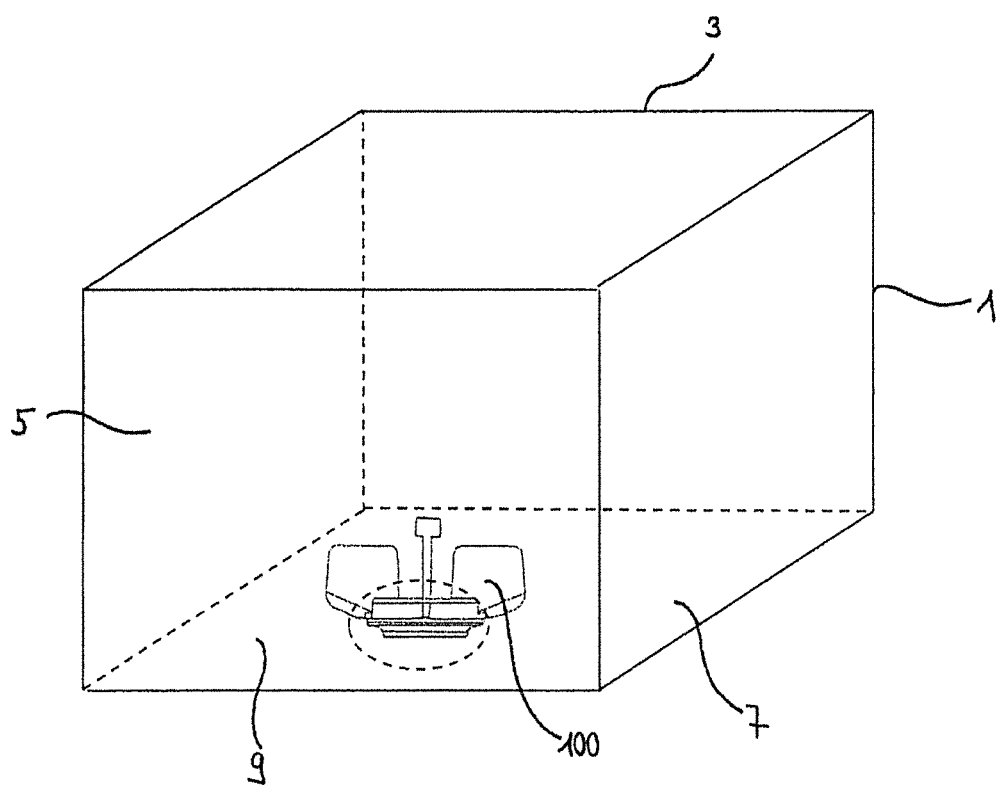
FIG. 1 shows a mixing device with an inserted stirring element.

FIG. 1 shows a mixing device 1 according to a preferred embodiment. The mixing device can be a bioreactor, for example, in which, for example, fluids and/or solids for culturing cell cultures are mixed.

The mixing device 1 comprises a container 3 for accommodating at least one fluid and/or at least one solid. The container 3 can be designed to be rigid or in the form of a flexible case. In particular, the mixing device 1 can be designed to be reusable or in the form of a disposable mixing device.

In the case of sterile uses, before the fluids and/or solids are filled into the container 3, an inner space 5 of the container 3 is preferably sterilized. However, this can also occur already in the context of the production process of the mixing device 1. The container 3 comprises a closed wall surface, which is interrupted only by special supply and/or discharge openings (not shown), through which one or more fluids or solids can be supplied and/or discharged. However, such openings are designed so that the sterile conditions in the inner space 5 are not influenced.

In the inner space 5 of the container 3, at least one stirring element 100 is arranged, for mixing individual fluids or solids contained in the container 3. Here, the stirring element 100 can be arranged at any position of the container wall 7. However, the stirring element 100 is located preferably on a container floor surface 9.

Figure 2A:
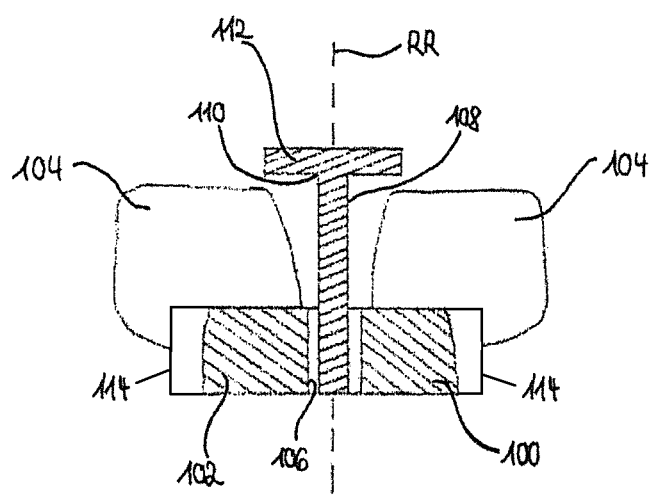
FIG. 2a) shows a cross-sectional view taken along a plane that includes the rotation axis and is intermediate the pole protrusions and through the stirring element.

In reference to FIG. 2a), the stirring element 100 is specified in further detail below.

The stirring element 100 comprises a base body 102, which is preferably designed to be substantially cylindrical. On the base body 102, a plurality of stirring and/or blade elements 104 are arranged, which are arranged around a stirring element rotation axis RR. The blade elements 104 are preferably designed in the form of substantially plate-shaped elements, which are preferably arranged radially around the stirring element rotation axis RR.

Preferably, the distances between the individual blade elements 104 are of equal size. However, it is also possible that the distances vary from one another. "Plate-shaped" is understood here to mean a substantially flat design. However, "plate-shaped" is not limited to the effect that the blade elements 104 have to have a flat design. It is also possible to design the blade elements 104 so that they are curved (for example, in the form of a screw). The blade elements 104 can comprise rounded edges as shown in FIG. 2a) or angular edges. In particular, the blade elements 104 can be oriented parallel to the stirring element rotation axis RR or they can be tilted by a certain angle relative to the stirring element rotation axis RR.

The base body 102 comprises a base body passage hole 106, which is arranged in the center of the base body 102 and penetrates the base body 102 in the direction of the stirring element rotation axis RR. In this base body passage hole 106, a bearing element, which is preferably in the form of a bearing rod 108, is arranged at least partially. By means of the bearing rod 108, the stirring element 100 can be fastened or can be arranged in a fixed position on the container 3 of the mixing device 1 and mounted rotatably around the stirring element rotation axis RR on said container. On a first free end 110 of the bearing rod 108, a limiting element 112 is arranged, which is preferably designed to be substantially cylindrical. The diameter of the limiting element 112 is preferably greater than the diameter of the bearing rod 108. In particular, the diameter of the limiting element 112 has a size so that the limiting element 112 overlaps the blade element 104 at least partially. As a result, it is possible to ensure that the stirring element is mounted reliably and cannot slip off of the bearing rod 108. The limiting element 112 and the bearing rod 108 can be connected to one another or designed as a single piece.

Alternatively, the limiting element 112 is arranged in such a manner that it overlaps the base body 102, in order to prevent the stirring element 100 from slipping off of the bearing rod 108.

Figure 2B:
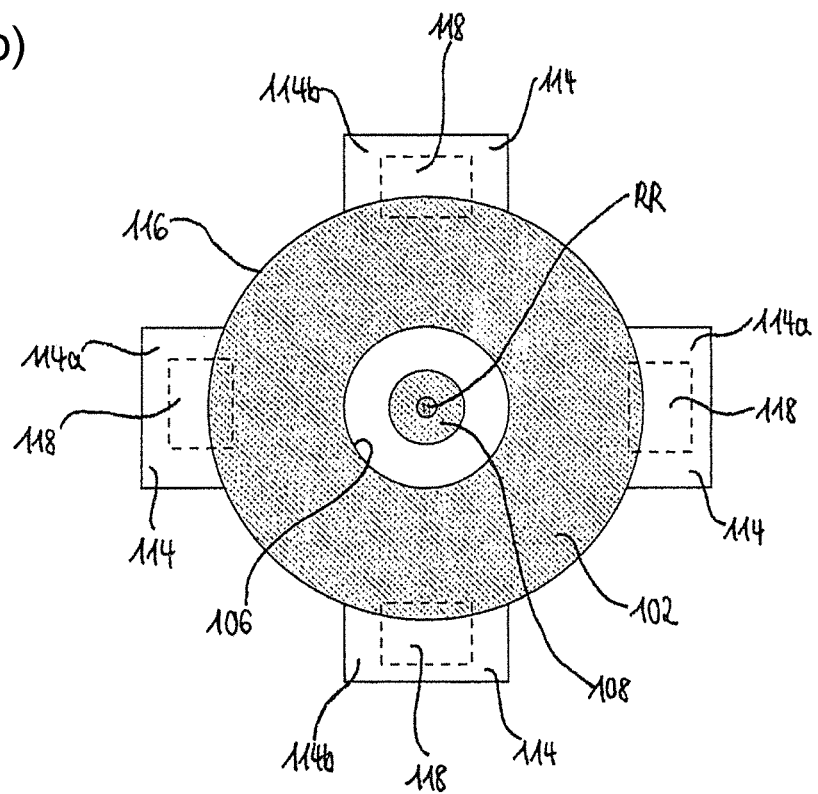
FIG. 2b) shows a cross-sectional view through the base body of the stirring element perpendicular to the stirring element rotation axis.

FIG. 2b) shows a cross-sectional view of the base body 102, in which the base body 102 is cut in a direction substantially perpendicular to the stirring element rotation axis RR. In this view, it becomes clear that the preferably cylindrical base body 102 preferably comprises moreover at least one pair of teeth or pole protrusions 114. These pole protrusions 114 are formed on a lateral surface 116 of the base body 102 wherein the pole protrusions 114 are preferably designed as a single piece with the base body 102.

The pole protrusions 114 of a pair of pole protrusions 114 are preferably arranged substantially on opposite sides of the base body 102. FIG. 2b) shows an embodiment with two pairs of pole protrusions 114, wherein the first pair of pole protrusions is marked 114a and the second pair of pole protrusions is marked 114b. Preferably, the distances between the individual pole protrusions 114 along the peripheral direction are substantially the same. However, it is also possible that the distances between the pole protrusions 114 vary from one another.

The base body 102 as well as the blade elements 104, the bearing rod 108 and the limiting element 112 are preferably made of plastic.

In the pole protrusions 114, preferably at least one non-permanently magnetized element 118 is arranged in each case. Said element can be formed, for example, from a ferromagnetic material such as iron. A particularly suitable non-permanently magnetized element is an element made of highly permeable materials (for example, with a permeability number $\mu_r > 4$, preferably $\mu_r > 100$, particularly preferably $\mu_r > 300$) and/or soft magnetic materials, for example, an iron core and/or electrical steel plates or strips (in particular according to standard EN 10106 "Cold rolled non-grain-oriented electrical steel plate and strip in fully annealed state" or, in particular, according to standard EN 10106 "Grain-oriented electrical steel plate and strip in fully annealed state"), for example, made of cold rolled iron-silicon alloys. In particular, the non-permanently magnetized element 118 is arranged here in the pole protrusions 114 in such a manner that the non-permanently magnetized element 118 is covered by the material of the pole protrusion 114 toward the outside. In other words, the non-permanently magnetized elements 118 are embedded in the pole protrusions 114, so that none of the fluids or solids in the inner space 5 of the mixing device 1 can come in contact with the non-permanently magnetized material and react with it.

The non-permanently magnetized element 118 here can be arranged entirely in the corresponding pole protrusion 114 or extend at least partially into said pole protrusion.

However, it is also conceivable that the base body 102 comprises no pole protrusions 114 and that the non-permanently magnetized elements 118 are arranged within the cylindrical base body 102. The arrangement of the non-permanently magnetized elements 118 within the base body 102 is in accordance with the embodiment with pole protrusions 114. The non-permanently magnetized elements 118 are here merely set back in the base body 102 with respect to the stirring element rotation axis RR.

Figure 3A:
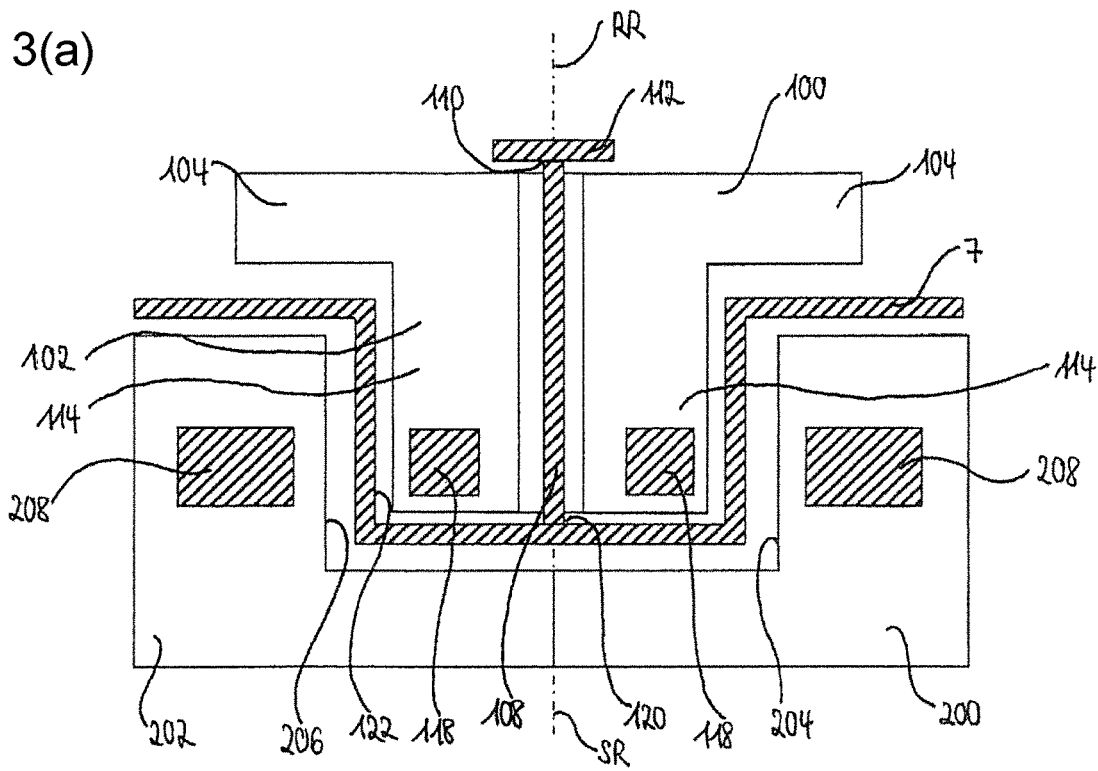
FIG. 3a) shows a cross-sectional view through an embodiment of a mixing device, which is attached on a drive device, along a stirring element rotation axis or a stator housing rotation axis.

FIG. 3a) shows a cross-sectional view of the stirring element 100, in which the stirring element 100 is cut along the stirring element rotation axis RR through a pair of pole protrusions 114. Furthermore, in the cross-sectional view, a section of the container wall 7 of the mixing device 1 can be seen, on which the stirring element 100 is mounted.

For the mounting and fixing of the stirring element 100, a second free end 120 of the bearing rod 108 of the stirring element 100, end which is opposite from the first free end 110, is fastened on the container wall 7 of the mixing device 1. Suitable for the fastening are gluing, welding, a latching mechanism, a bayonet closure, a screw mechanism, etc. In the fastened state, the bearing rod 108 preferably protrudes perpendicularly to the container wall 7 into the inner space 5 of the mixing device 1.

If the container 3 of the mixing device 1 is designed as a flexible case, for example, made of plastic, it is preferable that at least the section of the container wall 7 on which the stirring element 100 is attached is designed to be rigid. This can occur in that the wall thickness in this section is designed to be thicker. Alternatively or additionally, a reinforcing layer having substantially rigid properties in this section can be applied to the container wall 7 or fastened or arranged thereon.

Furthermore, as shown in FIG. 3a), in the section in which the stirring element 100 is mounted, the container wall 7 comprises a wall recess 122. This wall recess is preferably designed to be substantially cylindrical, so that the base body 102 of the stirring element 100 can be inserted at least partially into the wall recess 122. For this purpose, the diameter of the wall recess 122 is greater than the distance between two outer ends of opposite pole protrusions 114. In particular, the diameter of the wall recess 122 should be selected so that a rotation of the stirring element 100 in the wall recess 122 is possible.

Moreover, in FIG. 3a), a cross section through a drive device 200 is shown, on which the mixing device 1 together with the stirring element 100 is attached, and by means of which the stirring element 100 can be set in rotation by reluctance.

The drive device 200 comprises a stator housing 202 with a stator recess 204, which is designed so that the wall recess 122 of the container 3 of the mixing device 1 together with the base body 102 of the stirring element 100 can be inserted at least partially into the stator recess 204. Preferably, the stator recess 204 is also designed to be cylindrical with respect to a stator housing axis SR, so that the stator housing axis SR coincides with the stirring element rotation axis RR when the mixing device 1 is attached on the drive device 200.

The stator recess 204 comprises a recess wall 206 which surrounds the container wall 7 of the mixing device 1 as well as the base body 102 of the stirring element 100 around the stator housing axis SR or the stirring element rotation axis RR.

Figure 3B:
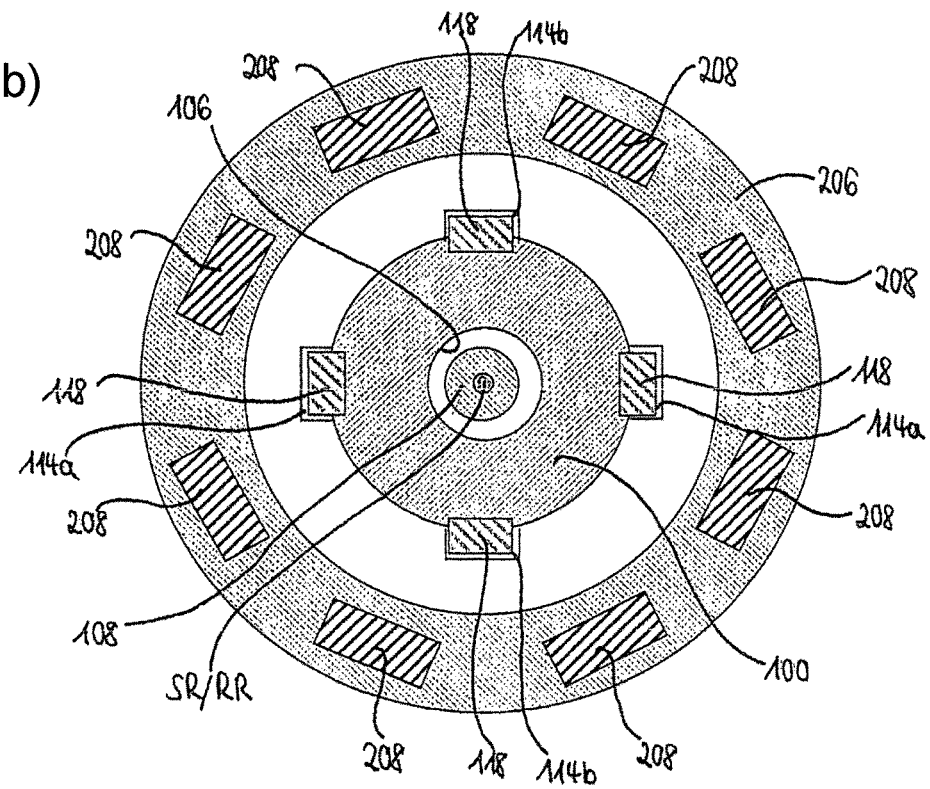
FIG. 3b) shows a cross-sectional view through the embodiment of FIG. 3a along a direction perpendicular to the stirring element rotation axis or the stator housing rotation axis and with the stirring element rotated relative to the state or so that the pole protrusions are offset rotationally from the coils.

For illustration, FIG. 3b) shows a cross-sectional view through the recess wall 206 and the stirring element 100 perpendicular to the stator housing axis SR or the stirring element rotation axis RR. However, for a simplified representation, the container wall 7 is not shown in this figure.

As shown in FIG. 3b), in the recess wall 206 of the stator housing 200, at least two pairs of coils 208 are arranged. The coils 208 of a pair are arranged substantially on opposite sides from one another with respect to the stator housing axis SR, so that they are arranged preferably substantially cylindrically around the stator housing axis SR. FIG. 3b) shows the special case of three pairs of coils 208. However, the number of pairs can conceivably be 2, 4, 5, 6, 7, 8, etc.

By means of a control device, which is not shown, the pairs of coils 208 can be controlled or regulated in such a manner that current can flow sequentially through them. In other words, by means of the control device, current flows successively through the pairs of coils 208 in the clockwise or counterclockwise direction.

If current flows through a pair of coils 208, a magnetic field is generated, which extends, in particular, also toward the stator housing rotation axis SR or the stirring element rotation axis RR. But once current no longer flows through the pair of coils 208, this magnetic field disappears again. However, since the control device actuates the pairs of coils 208 in such a manner that current now flows through the adjacent pair of coils 208, a new magnetic field is generated which, however, is shifted or offset with respect to the stator housing axis SR in the clockwise or counterclockwise direction (depending on which adjacent pair of coils 208 current is flowing though). In other words, the magnetic field "migrates" with respect to the stator housing axis SR due to a sequential flow of current through the pairs of coils 208. Here, it is preferable that the current intensity is substantially identical, in order to achieve a uniform rotation of the stirring element 100.

Due to the magnetic fields generated, the pairs of non-permanently magnetized elements 118, which are preferably located in the pairs of pole protrusions 114a, 114b, act as poles.

Due to the magnetic fields generated, reluctance forces act on these poles, causing the stirring element 100 to reach a state, as a result of rotation, in which the reluctance is lowest. This is achieved when the pair of non-permanently magnetized elements 118, which is located in the magnetic field, is aligned, with respect to the stator housing rotation axis SR or the stirring element rotation axis RR in a line, with the pair of coils 208 through which current flows.

In particular, the drive of the stirring element 100 can be implemented according to the principle of a synchronous reluctance motor, in which the synchronous reluctance motor, in the manner of an asynchronous machine, comprises a wound multiphase stator (drive device 200 with coils 208). The stirring element 100, which is designed as a rotor, is preferably not round, but instead comprises pronounced poles or protrusions 114. Preferably, the drive is actuated according to the principle of the synchronous reluctance motor by means of a frequency converter. Furthermore, the drive of the stirring element 100 can be implemented according to the principle of an asynchronous motor with reluctance moment, wherein, if a frequency converter is dispensed with, the motor, in the manner of an asynchronous machine, is provided particularly with a short circuit cage. As in the case of an asynchronous motor, in this case the drive is started up and runs until it comes close to the asynchronous equilibrium rotation speed, wherein the reluctance effect then predominates, and the rotor or the stirring element 100 turns or rotates substantially synchronously with the rotation field. It is also conceivable to use a frequency converter-supplied synchronous reluctance motor as drive of the stirring element 100. In addition, the drive of the stirring element 100 can, in particular, be implemented according to the principle of a switched reluctance motor (SRM or SR drive), wherein, in this case, the drive, similar to the other reluctance drives, in particular, [sic] a different number of pronounced teeth or protrusions on the rotor (stirring element 100) and stator. In particular, the stator teeth are wound or provided with coils 208 which are switched on or switched off alternately, wherein the teeth with the energized windings or coils 208 in each case attract the closest teeth of the rotor (poles 114) like an electric magnet, and are switched off when (or shortly before) the teeth (poles 114) of the rotor (stirring element 100) face the stator teeth (coils 208) attracting them. In this position, the next phase is switched on at other stator teeth or coils 208, which attracts other teeth or protrusions (poles 114) on the rotor or stirring element 100. In particular, a switched reluctance motor has three or more phases. However, special designs with only two phases or one phase also exist. In order to switch over at the correct time, the drive is generally equipped with a rotor position sensor. However, it is also conceivable to use a sensorless control method based on the stator current or the torque. Reluctance drives of this design are characterized by high robustness and a low construction cost. In the manner of asynchronous machines, in the non-energized state during rotation, in particular, no torque develops. However, a residual magnetization often leads nevertheless to a small cogging torque in the currentless state. Furthermore, the drive of the stirring element 100 can be implemented according to the principle of a reluctance step motor, wherein the reluctance step motor can be constructed in the manner of a switched reluctance motor, but, in contrast to said switched reluctance motor, the switching takes place without knowledge of the rotor position (stirring element 100).

In order to achieve a continuous rotation of the stirring element 100, it is advantageous if the number of pairs of non-permanently magnetized elements 118 is smaller than the number of pairs of coils 208. As a result, it can then be guaranteed that at no time are all the pairs of non-permanently magnetized elements 118 aligned, with respect to the stator housing axis SR or the stirring element rotation element RR, with a corresponding pair of coils 208. Thus, it is possible to prevent that the state of the lowest reluctance is already reached after a rotation movement and that no additional rotation movement can be achieved.

The more densely the pairs of coils 208 are arranged, the more any jerky rotations can be prevented.

If the number of pairs of non-permanently magnetized elements 118 is smaller than the number of pairs of coils 208, the pair of non-permanently magnetized elements 118 will become aligned with the pair of coils 208 through which current is flowing at that time and which is closest to this pair of coils 208 at that time.

The remaining pairs of non-permanently magnetized elements 118 are then offset relative to the pairs of coils 208 or aligned with no pair of coils 208. If the magnetic field is shifted as a result of current flowing through another pair of coils 208 by means of the control device (not shown), the closest pair of non-permanently magnetized elements 118 becomes aligned again by the reluctance force with the pair of coils 208 through which current flows. Thus, due to the alternation of the magnetic fields and the non-permanently magnetized elements 118, a rotation of the stirring element 100 is generated by means of reluctance forces.

Here, it is particularly advantageous that there is no need for elements that require a penetration of the container wall 7, so that the sterile conditions in the mixing device 1 can be maintained. Consequently, a driving of the stirring element 100 occurs only due to the reluctance force through the container wall 7.

Figure 4:
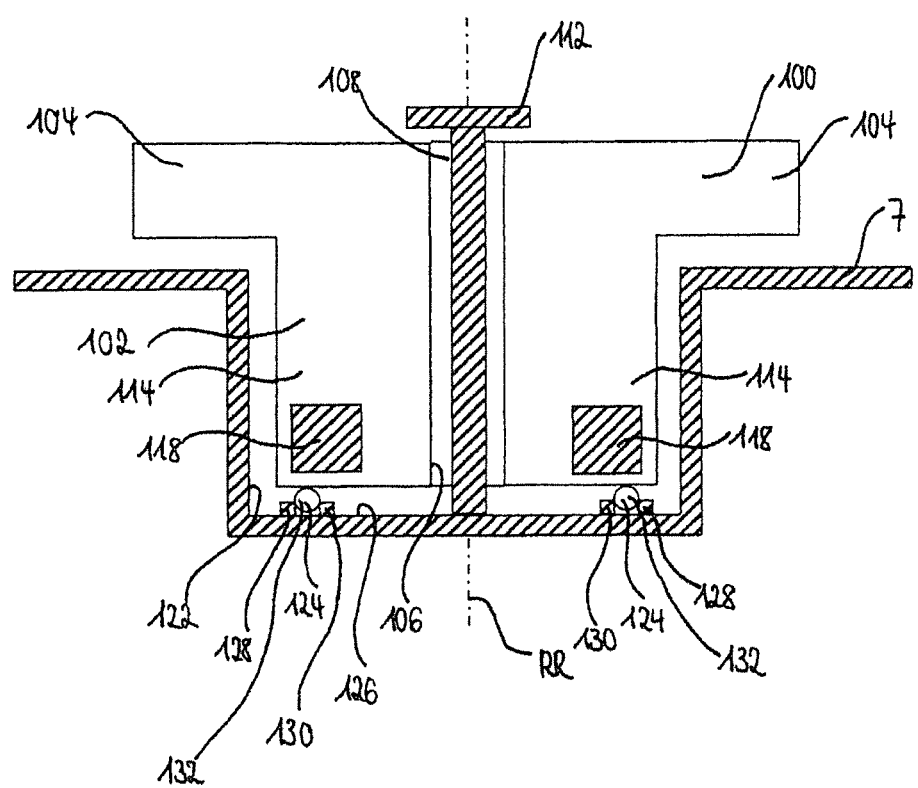
FIG. 4 shows a cross-sectional view through a mixing device, in which the stirring element is mounted on a ball bearing.

FIG. 4 shows a cross-sectional view through the stirring element 100 according to an additional embodiment perpendicular to the stirring element rotation axis RR through a pair of pole protrusions 114. Also shown is a cross section through the wall recess 122 of the container wall 7 of the mixing device 1, in which the stirring element 100 is at least partially arranged. The depicted section of the container wall 7 is only the section of the container wall 7 on which the stirring element 100 is arranged.

To achieve a uniform and simplified rotation of the stirring element 100, a bottom ball bearing 124 can be arranged on a wall recess bottom surface 126 of the wall recess 122 of the mixing device 1. "Wall recess bottom surface" 126 here is understood to mean the surface of the wall recess 122 on which the bearing rod 108 is fastened. Preferably, this surface is oriented perpendicularly to the stirring element rotation axis RR.

For this purpose, the bottom ball bearing 124 preferably comprises an outer ring 128 and an inner ring 130, the centers of which are arranged on the stirring element rotation axis RR. Between the outer ring 128 and the inner ring 130, a plurality of rolling elements 132 such as balls, for example, are arranged, with which the base body 102 of the stirring element 100 is in contact.

Figure 5:
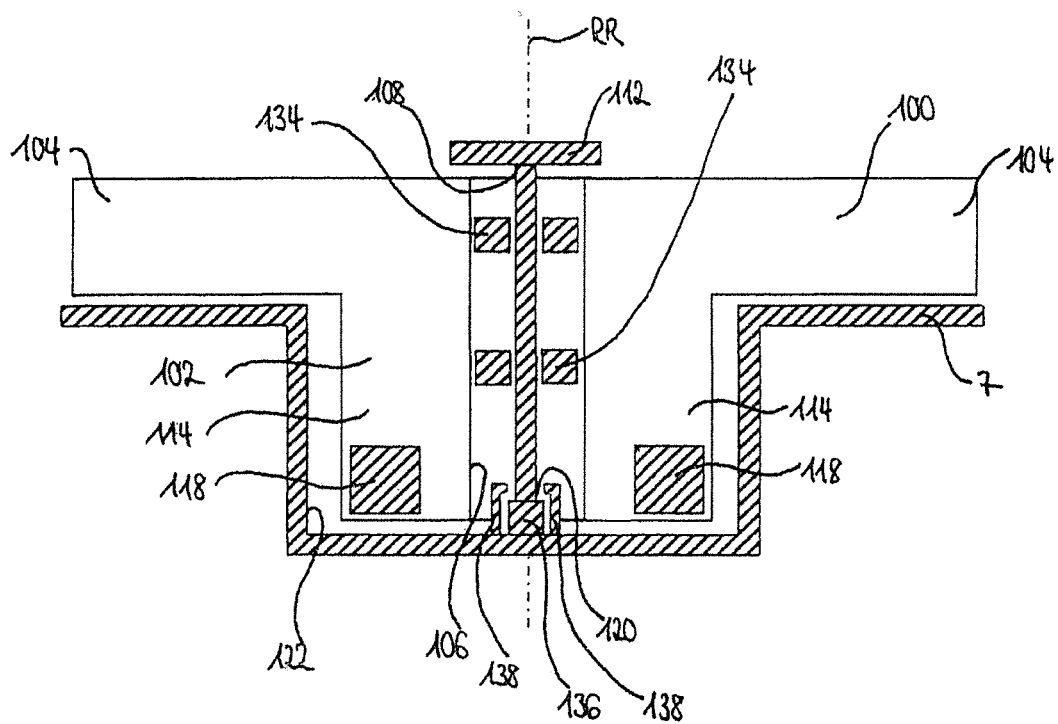
FIG. 5 shows a cross-sectional view through a mixing device with a latching mechanism for latching the stirring element to the container wall of the mixing device and with a bearing rod ball bearing.

FIG. 5 shows an additional embodiment for mounting the stirring element 100, which can be used alternatively or additionally to the embodiment of FIG. 4.

FIG. 5 again shows a cross-sectional view through the stirring element 100 perpendicular to the stirring element rotation axis RR through a pair of pole protrusions 114. Moreover, a cross section through the wall recess 122 of the container wall 7 of the mixing device 1 is shown, wall recess in which the stirring element 100 is arranged at least partially. The depicted section of the container wall 7 is only the section of the container wall 7 on which the stirring element 100 is arranged.

In this embodiment, at least one bearing rod ball bearing 134 is inserted between the bearing rod 108 and the base body 102 and/or the blade elements 104. The bearing rod ball bearing 134 is used for mounting the rotating elements of the stirring element 100 around the stationary bearing rod 108.

The individual bearing rod ball bearings 134 can be arranged at different heights with respect to the stirring element rotation axis RR. FIG. 5 shows, as an example, an embodiment with two bearing rod ball bearings 134, wherein one bearing rod ball bearing 134 is arranged here between the bearing rod 108 and the blade elements 104, while the second bearing rod ball bearing 134 is arranged between the bearing rod 108 and the base body 102 of the stirring element 100.

In addition, FIG. 5 shows a fastening option by means of which the bearing rod 108 can be fastened, in particular, to the container wall 7. This fastening option can be used alternatively or additionally to the other embodiments.

On the second free end 120 of the bearing rod 108, a latching element 136 is arranged. Said latching element preferably has a larger diameter than the bearing rod 108 and can be designed so as to form a single piece with the bearing rod 108. Alternatively, the latching element 136 can be fastened to the bearing rod 108, as shown in FIG. 5.

The latching element 136 can engage by means of a plurality of latching hooks 138 which are fastened to the container wall 7. As soon as the latching element 136 is hooked with the latching hooks 138, the latching hooks 138 enclose the latching element 136 at least partially, so that the bearing rod 108 and consequently the stirring element 100 are firmly and respectively axially attached to the container wall 7. In order to enable a latching, the latching hooks 138 are preferably designed so as to be resettable. The latching hooks 138 are preferably arranged cylindrically around the stirring element rotation axis RR. However, alternatively to a plurality of latching hooks 138, it is also conceivable that a latching wall which is a peripheral latching wall around the stirring element rotation axis RR is formed, with which the latching element 136 engages.

FIG. 6 again shows a cross-sectional view through the stirring element 100 perpendicular to the stirring element rotation axis RR through a pair of pole protrusions 114. Moreover, a cross section through the wall recess 122 of the container wall 7 of the mixing device 1 is shown, wall recess in which the stirring element 100 is arranged at least partially. The depicted section of the container wall 7 is only the section of the container wall 7 on which the stirring element 100 is arranged. In contrast to FIGS. 4 and 5, FIG. 6 additionally shows a cross section through the drive device 200 on which the mixing device 1 is attached.

Figure 6:
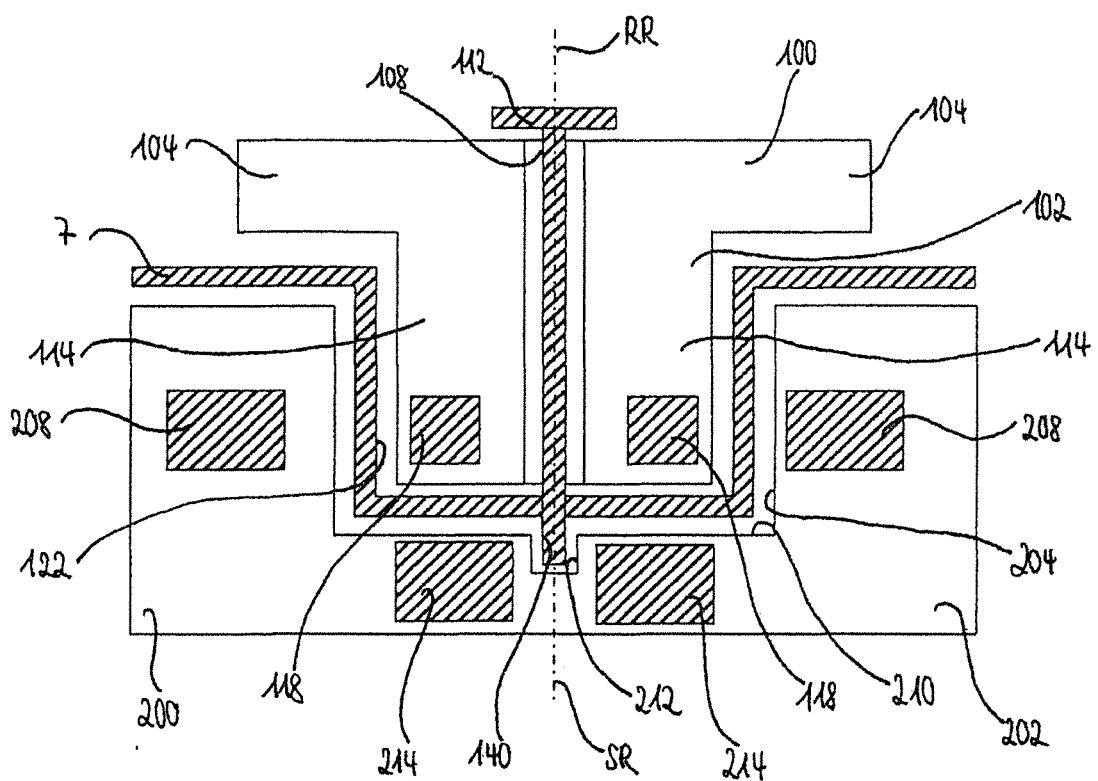
FIG. 6 shows a cross-sectional view through a mixing device with additional embodiments for mounting of the stirring element.

FIG. 6 shows an embodiment similar to that in FIG. 3, but it has a lengthened bearing rod 108 which penetrates the container wall 7 of the mixing device 1. In other words, a section of the bearing rod 108 protrudes outward. The length of the outwardly protruding section 140 of the bearing rod 108 can here be selected freely. The purpose of the outwardly protruding section 140 of the bearing rod 108 is to arrange said protruding section in a bearing rod recess 212 which is formed in a stator recess bottom surface 210. "Stator recess bottom surface" 210 is understood to mean the surface of the stator recess 204 which intersects the stator housing rotation axis SR substantially perpendicularly. Due to an insertion of the outwardly protruding section 140 of the bearing rod 108 into the bearing rod recess 212, an additional latching of the mixing device 1 in position on the stator housing 202 can be provided.

However, in order not to influence, in particular negatively influence, the sterile conditions in the mixing device 1 due to the lengthened bearing rod 108 which penetrates the container wall 7, the container wall 7 is connected in a fluid-tight manner to the bearing rod 108.

In addition or alternatively, one or more bearing coils 214 can be arranged under the stator recess bottom surface 210 of the stator housing 202.

In particular, the bearing coils 214 are to be arranged under the non-permanently magnetized elements 118 in the stirring element 100 when the mixing device 1 is attached on the stator housing 202.

Current can flow through the bearing coils 214 by means of the control device (not shown) in such a manner that the poles of the bearing coils 214 are oriented identically to the poles of the non-permanently magnetized elements 118. As a result, the non-permanently magnetized elements 118 are exposed to a repelling force, so that the non-permanently magnetized elements 118 are lifted together with the stirring element 100. Only the bearing rod 108 together with the limiting element 108 remain fixed and are thus used as limitation, particularly in order to limit a lifting movement of the stirring element 100.

Figure 7:
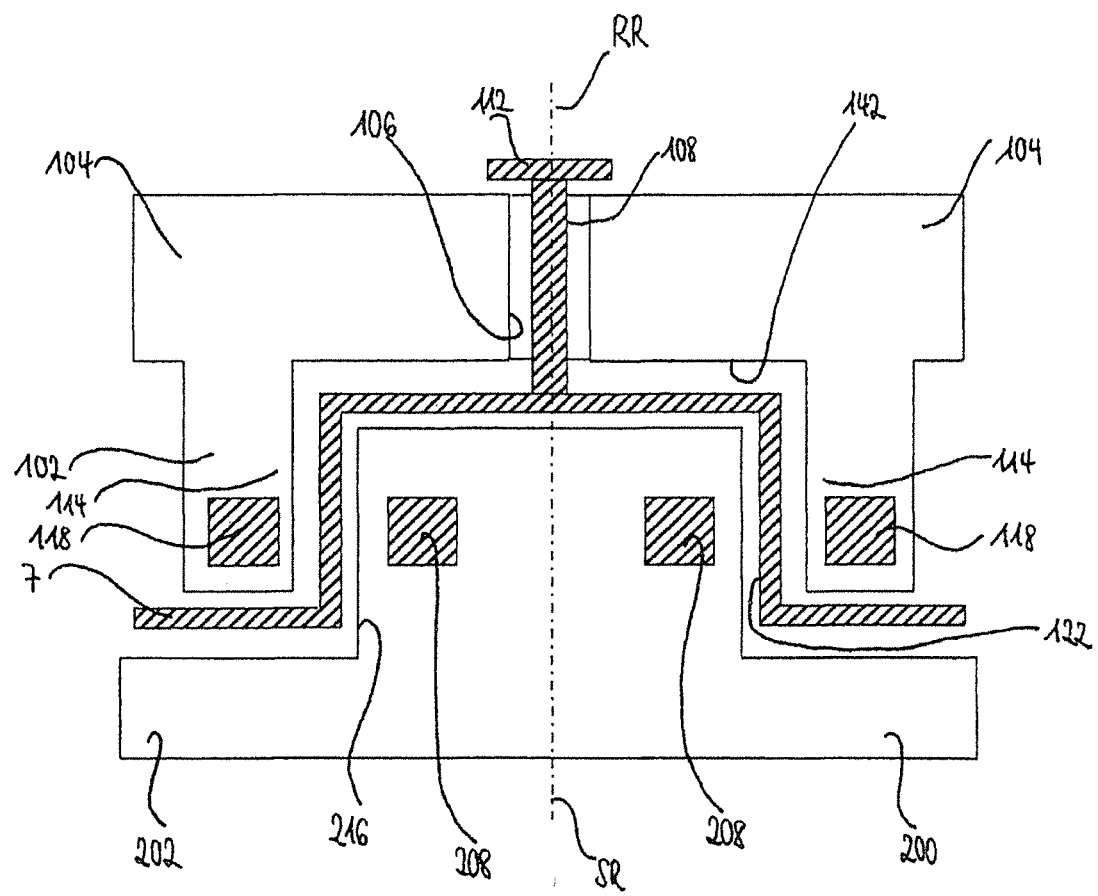
FIG. 7 shows a cross-sectional view through a mixing device with an alternative arrangement of the coils in the drive device.

FIG. 7 shows an additional embodiment, in which the stator housing 202 of the drive device 200 does not comprise a stator recess 204, but rather comprises a stator protrusion 216. The container wall 7 of the mixing device 1 accordingly has a wall recess 122, which, in contrast to the other depicted embodiments, is formed inwardly toward the inner space 5 of the mixing device 1. The stator protrusion 216 protrudes into this wall recess 122 when the mixing device 1 is attached on the drive device 200. The depicted section of the container wall 7 is only the section of the container wall 7 on which the stirring element 100 is arranged.

Accordingly, the base body 102 of the stirring element 100 also has a base body recess 142 which is formed correspondingly to the stator protrusion 216. In the assembled state, the stator protrusion 216 then protrudes into the base body recess 142. The pole protrusions 114 together with the non-permanently magnetized elements 118 moreover protrude toward the stirring element rotation axis RR, so that, in contrast to the other embodiments, the pairs of pole protrusions 114 are now opposite one another with respect to the stirring element rotation axis RR.

Preferably, the stator protrusion 216, the wall recess 122, and the base body recess 142 are designed to be cylindrical and have a common rotation axis.

In contrast to the preceding embodiments, the coils 208 are arranged in the stator protrusion 216, so that the non-permanently magnetized elements 118 of the mixing device 1 surround the coils 1. However, in other cases the coils 208 are arranged adjacent to the non-permanently magnetized elements 118 of the mixing device 1.

With regard to this embodiment, FIG. 7 shows a cross-sectional view through the stirring element 100, the container wall 7 and the drive device 200 in the assembled state, perpendicular to the stirring element rotation axis RR or the stator housing rotation axis SR through a pair of pole protrusions 114.

Although not shown in any of the figures, it is possible, in addition, that the coils 208 are arranged not only in one plane with respect to the stator housing rotation axis SR, but also in several planes (axially offset along the stator housing rotation axis SR).

Moreover, it is pointed out that, although the individual embodiments are shown with pole protrusions 114, they represent a preferred embodiment. An arrangement of the non-permanently magnetized elements 118 can then be implemented without the pole protrusions 114, as described in reference to FIG. 2b).

LIST OF REFERENCE NUMERALS

1 Mixing device
3 Container
5 Inner space
7 Container wall
100 Stirring element
102 Base body
104 Blade element
106 Base body passage hole
108 Bearing rod
110 First free end of the bearing rod
112 Limiting element
114 Pole protrusion
114a First pair of pole protrusions
114b Second pair of pole protrusions
116 Lateral surface
118 Non-permanently magnetized element
120 Second free end of the bearing rod
122 Wall recess
124 Bottom ball bearing
126 Wall recess bottom surface
128 Outer ring
130 Inner ring
132 Rolling element
134 Bearing rod ball bearing
136 Latching element
138 Latching hook
140 Outwardly protruding section of the bearing rod
142 Base body recess
200 Drive device
202 Stator housing
204 Stator recess
206 Recess wall
208 Coil
210 Stator recess bottom surface
212 Bearing rod recess
214 Bearing coil
216 Stator protrusion
RR Stirring element rotation axis
SR Stator housing rotation axis

The invention claimed is:

1. A mixing system, comprising:
a mixing device (1), comprising:
a container (3) with an inner space (5) for accommodating fluids and/or solids;
a rotatable stirring element (100) for mixing the fluids and/or solids, the rotatable stirring element (100) having a base body (102) and blade elements (104) arranged on the base body (102) and radially around a stirring element rotation axis (RR) extending perpendicularly from the base body (102), the blade elements (104) being configured to mix the fluids and/or solids in the container (3) by rotation of the stirring element (100), and the base body (102) and the blade elements (104) being made of plastic as a single piece;
a bearing element for mounting the stirring element (100), the bearing element (104) comprising a stationary bearing rod (108) and multiple bearing rod ball bearings (134) arranged at different heights with respect to the stirring element rotation axis (RR) for mounting the rotating elements of the stirring element (100) around the stationary bearing rod (108), such that at least a first of the bearing rod ball bearings (134) is arranged between the stationary bearing rod (108) and the blade elements (104), and at least a second of the bearing rod ball bearings (134) is arranged between the bearing rod (108) and the base body (102) of the stirring element (100);

wherein the stirring element (100) comprises non-permanently magnetized elements (118) arranged within the base body (102) or embedded in at least one pair of pole protrusions (114), so that the stirring element can be set in rotation by reluctance forces induced from outside; and a drive device (200) for driving the stirring element (100) in the mixing device (1), the drive device (200) comprising:
- a stator housing (202) on which the mixing device (1) with fluids or solids to be mixed can be attached;
- at least two pairs of coils (208) through which current can flow and that are arranged in pairs on opposite sides with respect to a stator housing axis (SR); and
- a control device designed so that current flows successively through the pairs of coils (208), so that the stirring element (100) of the mixing device (1) can be driven by reluctance forces induced in the stirring element (100), wherein:

the number of pairs of coils (208) in the drive device (200) is greater than the number of pairs of pole protrusions (114), and the rotatable stirring element (100), the bearing rod (108) and the base body (102) of the stirring element (100) are positioned inside the inner space (5) of the container (3).

2. The mixing system of claim 1, wherein the bearing rod (108) is inserted at least partially into the stirring element (100) to work as pivot bearing.

3. The mixing system of claim 1, wherein a lateral surface (116) of the base body (102) comprises at least one pair of pole protrusions (114), the pole protrusions (114) in the at least one pair of pole protrusions (114) being arranged on opposite sides of the base body (102).

4. The mixing system of claim 1 wherein the container (3) has at least one cylindrical wall recess (122), in which the base body (102) of the stirring element (100) is at least partially inserted.

5. The mixing system of claim 4, wherein at least one wall surface area of the container (3), in which the wall recess (122) is arranged, is rigid.

6. The mixing system of claim 1, wherein the coils (208) have coil axes that intersect the stator housing axis (SR) substantially perpendicularly.

7. The mixing system of claim 1, wherein the stator housing (202) has a stator recess (204), into which the stirring element (100) of the mixing device (1) can be inserted,
wherein the coils (208) are arranged at least partially in a recess wall (206) that limits the stator recess (204) in lateral direction along the stator housing axis (SR).

8. The mixing system of claim 1
wherein a stirring element rotation axis (RR) and the stator housing axis (SR) are identical.

9. The mixing system of claim 8, wherein the coils (208) in the drive device (200) and the non-permanently magnetized elements (118) arranged within the base body (102) are arranged in a common plane perpendicular to the stirring element rotation axis (RR) and the stator housing axis (SR).

10. The mixing system of claim 1, wherein the first of the bearing rod ball bearings (134) is arranged at a first axial position that is aligned axially with an axial position where the blade elements (104) extend perpendicularly from the base body (102), and the second of the bearing rod ball bearings (134) is arranged at a second axial position that is spaced axially from axial positions where the blade elements (104) extend perpendicularly from the base body (102).

11. A method for driving the stirring element (100) in the mixing system of claim 1, the method comprising:
mounting the stirring element (100) rotatably in the bearing element;
attaching the mixing device (1) onto the drive device (200); and
causing current to flow sequentially through the pairs of coils (208), and thereby generating reluctance forces that act on the stirring element (100) and set it in rotation.

* * * * *